(12) United States Patent
Hester

(10) Patent No.: US 8,749,215 B2
(45) Date of Patent: Jun. 10, 2014

(54) SWITCHING METHOD TO REDUCE RIPPLE CURRENT IN A SWITCHED-MODE POWER CONVERTER EMPLOYING A BRIDGE TOPOLOGY

(75) Inventor: Richard K. Hester, McKinney, TX (US)

(73) Assignee: Texas Instruments Incorporated, Dallas, TX (US)

(*) Notice: Subject to any disclaimer, the term of this patent is extended or adjusted under 35 U.S.C. 154(b) by 228 days.

(21) Appl. No.: 12/872,831

(22) Filed: Aug. 31, 2010

(65) Prior Publication Data

US 2012/0049816 A1 Mar. 1, 2012

(51) Int. Cl.
*G05F 1/00* (2006.01)
*H02M 3/158* (2006.01)
*H02M 1/14* (2006.01)

(52) U.S. Cl.
CPC .............. *H02M 1/14* (2013.01); *H02M 3/1582* (2013.01)
USPC .......................................... 323/282; 323/285

(58) Field of Classification Search
USPC .......... 323/222, 223, 271, 282, 283, 284, 285
See application file for complete search history.

(56) References Cited

U.S. PATENT DOCUMENTS

| 6,037,755 A | 3/2000 | Mao et al. |
| 6,166,527 A * | 12/2000 | Dwelley et al. ............... 323/222 |
| 7,652,453 B2 | 1/2010 | Iulian |
| 7,768,245 B1 * | 8/2010 | De Cremoux ................ 323/259 |
| 2005/0007089 A1 * | 1/2005 | Niiyama et al. .............. 323/284 |
| 2005/0218876 A1 | 10/2005 | Nino |
| 2006/0284606 A1 * | 12/2006 | Chen et al. ..................... 323/259 |
| 2008/0164766 A1 * | 7/2008 | Adest et al. ..................... 307/80 |
| 2008/0203992 A1 * | 8/2008 | Qahouq et al. ................ 323/299 |
| 2009/0039852 A1 | 2/2009 | Fishelov et al. |
| 2009/0262556 A1 | 10/2009 | Tomiyoshi et al. |
| 2011/0006743 A1 * | 1/2011 | Fabbro .......................... 323/282 |

OTHER PUBLICATIONS

PCT Search Report mailed Mar. 15, 2012.

* cited by examiner

*Primary Examiner* — Nguyen Tran
(74) *Attorney, Agent, or Firm* — Alan A. R. Cooper; W. James Brady, III; Frederick J. Telecky, Jr.

(57) ABSTRACT

Traditionally, buck-boost switching regulators with bridge topologies have been avoided due to their inability to seamlessly transition between buck mode and boost mode. Here, however, a buck-boost switching regulator with a bridge topology has been provided, which has an improved controller. Namely, a processor (such as a digital signals processor or DSP) provides digital control for the bridge that reduces ripple current or variations in the inductor current by adjusting phase relationships between corresponding buck and boost switches in a bridge or buck-boost mode.

8 Claims, 2 Drawing Sheets

SWITCHING METHOD TO REDUCE RIPPLE CURRENT IN A SWITCHED-MODE POWER CONVERTER EMPLOYING A BRIDGE TOPOLOGY

CROSS-REFERENCE TO RELATED APPLICATIONS

This application is related to co-pending U.S. patent application Ser. No. 12/872,896, entitled "SWITCHING METHOD TO IMPROVE THE EFFICIENCY OF SWITCHED-MODE POWER CONVERTERS EMPLOYING A BRIDGE TOPOLOGY," filed herewith, which is hereby incorporated by reference for all purposes.

TECHNICAL FIELD

The invention relates generally to power converters and, more particularly, to power converters using a bridge topology.

BACKGROUND

There are a number of applications that may need a switching regulator or switched mode power supply to operate in non-inverting buck or boost modes, transitioning relatively seamlessly between the two. Turning to FIG. 1, an example of a bridge 100, which can operate in boost and buck modes can be seen. This bridge 100 is generally an H-bridge, using switches S1 to S4, and an inductor L, which is coupled between the switching nodes of the H-bridge. In buck mode, switches S4 and S3 are closed and open, respectively, while pulse width modulation (PWM) signals are provided to switches S1 and S2. Alternatively, in boost mode, switches S1 and S2 are closed and open, respectively, while PWM signals are provided to switches S3 and S4.

The most inefficient mode of operation, however, is a bridge mode or buck-boost mode, where two of the switches S1 to S4 are closed to generate an inductor voltage $V_L$. Some reasons for the inefficiency are that switching losses are incurred in all four of switches S1 to S4 and that this mode results in a high average inductor current $I_L$. Also contributing to the inefficiency is the rippled current (or variations in the inductor current $I_L$). As can be seen in FIG. 2, switches S1 and S3 are, for example, closed at the same time, and the inductor current $I_L$ varies between the periods in which both switches S1 and S3 are close or open, namely between times t1 to t2 and times t3 to t4.

Thus, there is a need for an improved switching regulator.

Some other conventional circuits are: U.S. Pat. No. 6,166,527; U.S. Pat. No. 6,037,755; and U.S. Patent Pre-Grant Publ. No. 2009/0039852.

SUMMARY

A preferred embodiment of the present invention, accordingly, provides an apparatus. The apparatus comprises a buck-boost switching regulator having buck switches, boost switches, an input terminal, and an output terminal, wherein the buck-boost switching regulator is adapted to operate in a buck mode, boost mode, and bridge mode; and control circuitry that is coupled to at least one of the output terminal and the input terminal and that controls the buck-boost switching regulator with control signals, and wherein the control circuitry adjusts phase relationships between corresponding boost switches and buck switching in bridge mode to reduce ripple current in the buck-boost switching regulator.

In accordance with a preferred embodiment of the present invention, the buck-boost switching regulator further comprises: a first switch that is coupled between the input terminal and a first switching node; a second switching that is coupled between the first switching node and ground; an inductor that is coupled between the first switching node and a second switching node; a third switch that is coupled between the second switching node and ground; and a fourth switching that is coupled between the second switching node and the output terminal.

In accordance with a preferred embodiment of the present invention, the control circuitry provides a first, second, third, and fourth control signals for the first, second, third, and fourth switches, respectively.

In accordance with a preferred embodiment of the present invention, the control circuitry adjusts the third control signal to have an on-time for the third switch that is centered to an off-time for the first switch.

In accordance with a preferred embodiment of the present invention, the control circuitry adjusts the second control signal to have an on-time for the second switch that is centered to an off-time for the fourth switch.

In accordance with a preferred embodiment of the present invention, the control circuitry further comprises: a voltage divider that is coupled to the output terminal; and an error amplifier that receives a reference voltage and that is coupled to the voltage divider and the processor.

In accordance with a preferred embodiment of the present invention, the processor is a digital signals processor (DSP).

In accordance with a preferred embodiment of the present invention, a method is provided. The method comprises detecting at least one of an input voltage, an output voltage, an input current, and an output current of a buck-boost switching regulator having buck switches, boost switches, an input terminal, and an output terminal, wherein the buck-boost switching regulator is adapted to operate in a buck mode, boost mode, and bridge mode; and operating the buck-boost switching regulator in a bridge mode, wherein phase relationships between corresponding boost switches and buck switching are adjusted to reduce ripple current in the buck-boost switching regulator.

In accordance with a preferred embodiment of the present invention, the buck-boost switching regulator further comprises: a first switch that is coupled between the input terminal and a first switching node, wherein the first switch receives a first control signal; a second switching that is coupled between the first switching node and ground, wherein the second switch receives a second control signal; an inductor that is coupled between the first switching node and a second switching node; a third switch that is coupled between the second switching node and ground, wherein the third switch receives a third control signal; and a fourth switching that is coupled between the second switching node and the output terminal, wherein the fourth switch receives a fourth control signal.

In accordance with a preferred embodiment of the present invention, the step of operating further comprises adjusting the third control signal to have an on-time for the third switch that is centered to an off-time for the first switch.

In accordance with a preferred embodiment of the present invention, the step of operating further comprises adjusting the second control signal to have an on-time for the second switch that is centered to an off-time for the fourth switch.

In accordance with a preferred embodiment of the present invention, an apparatus is provided. The apparatus comprises a solar cell; a buck-boost switching regulator having buck switches, boost switches, an input terminal, and an output terminal, wherein the buck-boost switching regulator is adapted to operate in a buck mode, boost mode, and bridge mode, wherein the input terminal is coupled to the solar cell; and control circuitry that is coupled to at least one of the output terminal and the input terminal and that controls the buck-boost switching regulator with control signals, and wherein the control circuitry adjusts phase relationships between corresponding boost switches and buck switching in bridge mode to reduce ripple current in the buck-boost switching regulator.

In accordance with a preferred embodiment of the present invention, the solar cell further comprises a plurality of solar cells.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
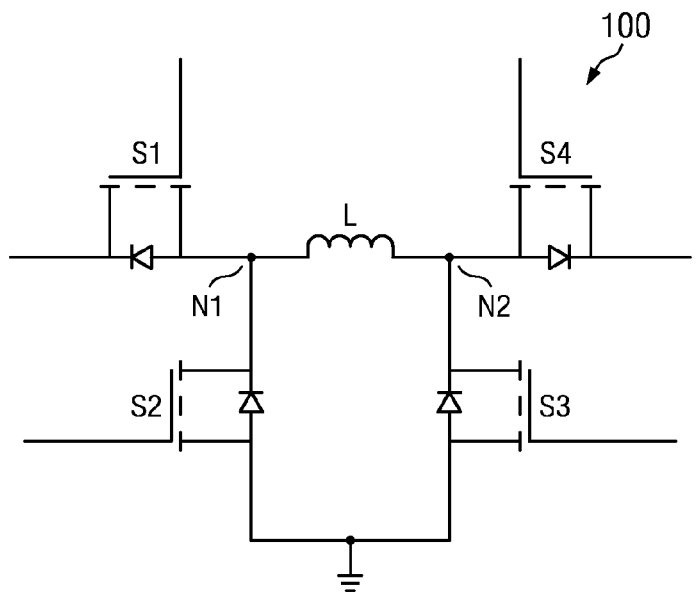
FIG. 1 is a circuit diagram of a conventional bridge.

Refer now to the drawings wherein depicted elements are, for the sake of clarity, not necessarily shown to scale and wherein like or similar elements are designated by the same reference numeral through the several views.

Figure 3:
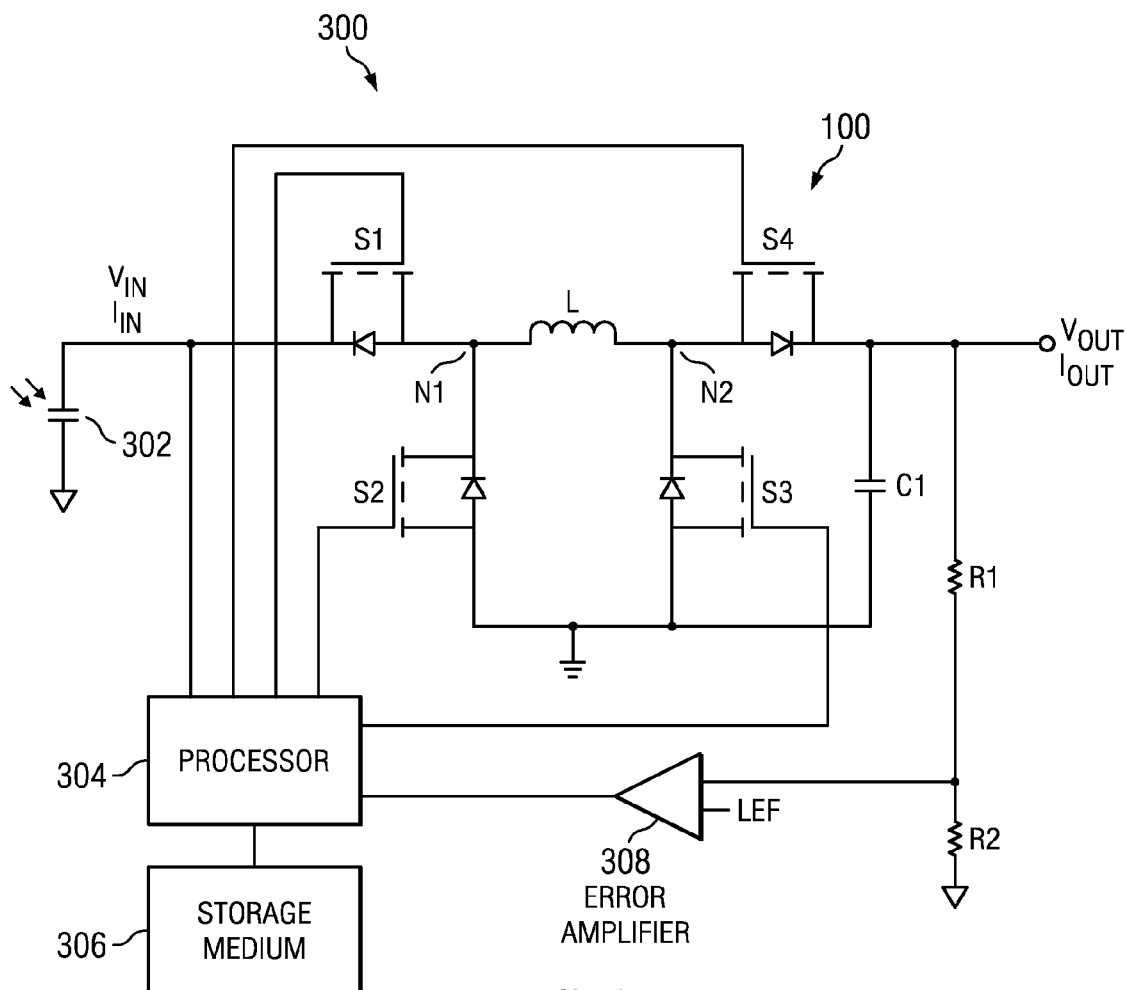
FIG. 3 is an example of a system in accordance with a preferred embodiment of the present invention.
Figure 2:
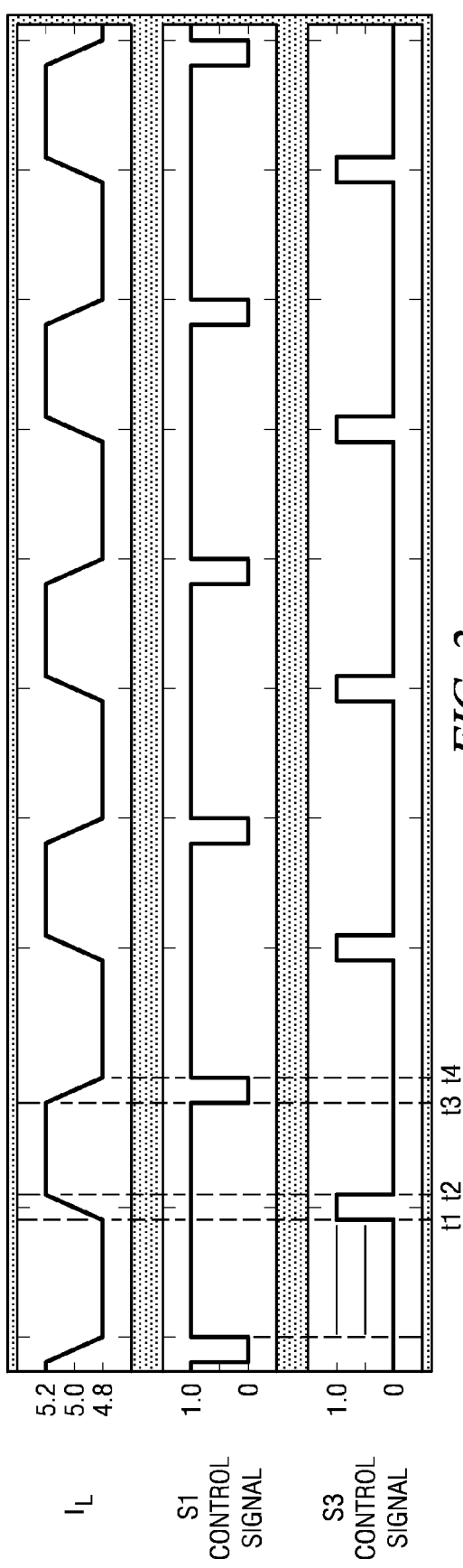
FIG. 2 is a timing diagram illustrating the relationship between bridge control signals and inductor ripple current for FIG. 1.

Turning to FIG. 3 of the drawings, an example of a system 300 in accordance with a preferred embodiment of the present invention can be seen. System 100 generally comprises a bridge 100, solar cell 302, capacitor C1, voltage divider (resistors R1 and R2), error amplifier 308, processor 304, and storage medium 306. Collectively, the voltage divider, error amplifier 308, processor 304, and storage medium 306 generally operate as a control circuitry, while bridge 100 and capacitor C1 generally operate as a buck-boost switching regulator. In operation, an input voltage $V_{IN}$ and input current $I_{IN}$ are provide to the input terminal of the switching regulator from, for example, a solar cell 302 (which may include multiple solar cells coupled in series or parallel to the input terminal) so as to generate an output voltage $V_{OUT}$ and an output current $I_{OUT}$ at the output terminal. The control circuitry measures the output voltage $V_{OUT}$ and the input voltage $V_{IN}$ and generates the appropriate pulse witch modulation (PWM) or control signals for switches S1 through S4. The error amplifier 308 compares an output from the voltage divider to a reference voltage REF so that the processor 304 can perform correction of the PWM signals. In an alternative arrangement, the error amplifier 308 and voltage divider can be removed, with the functionality being provided by the processor 304. In other alternative arrangements, input current $I_{IN}$, output current $I_{OUT}$, or input voltage $V_{IN}$ may be used instead of the output voltage $V_{OUT}$ for correction of the PWM signals. Additionally, the processor 304 may be a digital signals processor or DSP.

Figure 4:
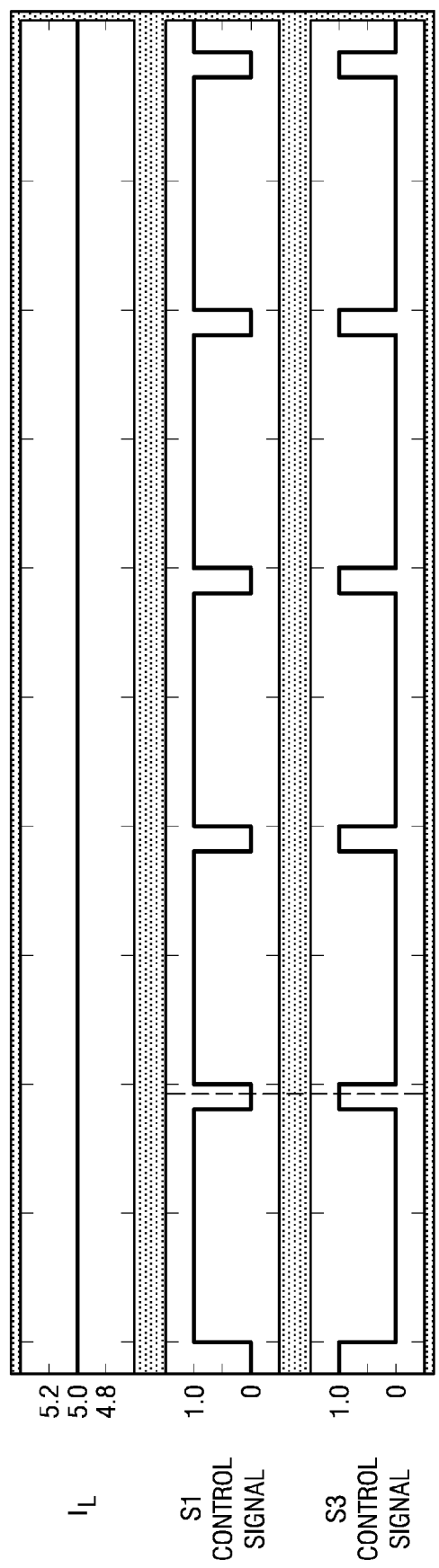
FIG. 4 is a timing diagram illustrating the relationship between bridge control signals and inductor ripple current for FIG. 3.

For conventional bridge switching or buck-boost operation modes, pairs of switches S1/S3 or S2/S4 are switched on and off at about the same time. As can be seen in FIG. 4, adjustment of the phase relationship between correspond buck switches (S1 or S2) and boost switches (S3 or S4) can result in a substantially reduced ripple in the inductor current $I_L$. Specifically, FIG. 4 shows that the on-time for switch S3 is centered at the off-time for switch S1, regardless of the on-time pulse width for switch S3. This same adjustment can also be made for the phase relationship between switches S2 and S4. As a result, with this phase relationship adjustment by processor 304, the inductor current $I_L$ is relatively constant, reducing losses during a bridge or buck-boost mode.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a buck-boost switching regulator having buck switches, boost switches, an input terminal, and an output terminal, wherein the buck-boost switching regulator is adapted to operate in a buck mode, boost mode, and bridge mode; and
   control circuitry that is coupled to at least one of the output terminal and the input terminal and that controls the buck-boost switching regulator with control signals, and wherein the control circuitry adjusts phase relationships between corresponding boost switches and buck switches in bridge mode to reduce ripple current in the buck-boost switching regulator,
   wherein the buck-boost switching regulator further comprises:
     a first switch that is coupled between the input terminal and a first switching node;
     a second switch that is coupled between the first switching node and ground;
     an inductor that is coupled between the first switching node and a second switching node;
     a third switch that is coupled between the second switching node and ground; and
     a fourth switch that is coupled between the second switching node and the output terminal
   wherein the control circuitry provides a first, second, third, and fourth control signals for the first, second, third, and fourth switches, respectively
   wherein the control circuitry adjusts the third control signal to have an on-time for the third switch that is centered to an off-time for the first switch, wherein an inductor current of the inductor coupled to the first and third switches is substantially constant wherein the control circuitry adjusts the third control signal;

wherein the control circuitry further comprises:
- a processor;
- a voltage divider that is coupled to the output terminal; and
- an error amplifier that receives a reference voltage and that is coupled to the voltage divider and the processor.

2. The apparatus of claim 1, wherein the control circuitry adjusts the second control signal to have an on-time for the second switch that is centered to an off-time for the fourth switch.

3. The apparatus of claim 1, wherein the processor is a digital signals processor (DSP).

4. A method comprising:
- detecting at least one of an input voltage, an output voltage and an input current, of a buck-boost switching regulator having buck switches, boost switches, an input terminal, and an output terminal, wherein the buck-boost switching regulator is adapted to operate in a buck mode, boost mode, and bridge mode; and
- operating the buck-boost switching regulator in a bridge mode, wherein phase relationships between corresponding boost switches and buck switching are adjusted to reduce ripple current in the buck-boost switching regulator, wherein the buck-boost switching regulator further comprises:
- a first switch that is coupled between the input terminal and a first switching node, wherein the first switch receives a first control signal;
- a second switching that is coupled between the first switching node and ground, wherein the second switch receives a second control signal;
- an inductor that is coupled between the first switching node and a second switching node;
- a third switch that is coupled between the second switching node and ground, wherein the third switch receives a third control signal; and
- a fourth switch that is coupled between the second switching node and the output terminal, wherein the fourth switch receives a fourth control signal wherein the step of operating further comprises adjusting the third control signal to have an on-time for the third switch that is centered to an off-time for the first switch, wherein the step of operating further comprises adjusting the second control signal to have an on-time for the second switch that is centered to an off-time for the fourth switch, wherein an inductor current of the inductor coupled to the first and third switches is substantially constant wherein the control circuitry adjusts the third control signal;

wherein the control circuitry further comprises:
- a processor;
- a voltage divider that is coupled to the output terminal; and
- an error amplifier that receives a reference voltage and that is coupled to the voltage divider and the processor.

5. An apparatus comprising:
- a solar cell;
- a buck-boost switching regulator having buck switches, boost switches, an input terminal, and an output terminal, wherein the buck-boost switching regulator is adapted to operate in a buck mode, boost mode, and bridge mode, wherein the input terminal is coupled to the solar cell; and
- control circuitry that is coupled to at least one of the output terminal and the input terminal and that controls the buck-boost switching regulator with control signals, and wherein the control circuitry adjusts phase relationships between corresponding boost switches and buck switches in bridge mode to reduce ripple current in the buck-boost switching regulator, wherein the buck-boost switching regulator further comprises:
- a first switch that is coupled between the input terminal and a first switching node;
- a second switching that is coupled between the first switching node and ground;
- an inductor that is coupled between the first switching node and a second switching node;
- a third switch that is coupled between the second switching node and ground; and
- a fourth switching that is coupled between the second switching node and the output terminal wherein the control circuitry provides a first, second, third, and fourth control signals for the first, second, third, and fourth switches, respectively wherein the control circuitry adjusts the third control signal to have an on-time for the third switch that is centered to an off-time for the first switch, wherein an inductor current of the inductor coupled to the first and third switches is substantially constant wherein the control circuitry adjusts the third control signal;

wherein the control circuitry further comprises:
- a processor;
- a voltage divider that is coupled to the output terminal; and
- an error amplifier that receives a reference voltage and that is coupled to the voltage divider and the processor.

6. The apparatus of claim 5, wherein the control circuitry adjusts the second control signal to have an on-time for the second switch that is centered to an off-time for the fourth switch.

7. The apparatus of claim 5, wherein the processor is a DSP.

8. The apparatus of claim 5, wherein the solar cell further comprises a plurality of solar cells.

* * * * *